United States Patent
Sugiyama et al.

(10) Patent No.: US 11,498,310 B2
(45) Date of Patent: *Nov. 15, 2022

(54) SHEET FORMED FROM CARBON FIBER REINFORCED THERMOPLASTIC RESIN, AND PRODUCTION METHOD OF SAID SHEET

(71) Applicant: MITSUBISHI GAS CHEMICAL COMPANY, INC., Tokyo (JP)

(72) Inventors: Genki Sugiyama, Tokyo (JP); Kohei Yoshiya, Ibaraki (JP); Hidetaka Shimizu, Ibaraki (JP); Hiroyoshi Maruyama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 467 days.

This patent is subject to a terminal disclaimer.

(21) Appl. No.: 16/608,604

(22) PCT Filed: May 14, 2018

(86) PCT No.: PCT/JP2018/018458
§ 371 (c)(1),
(2) Date: Oct. 25, 2019

(87) PCT Pub. No.: WO2018/216518
PCT Pub. Date: Nov. 29, 2018

(65) Prior Publication Data
US 2020/0277462 A1   Sep. 3, 2020

(30) Foreign Application Priority Data

May 24, 2017 (JP) .............................. JP2017-102252

(51) Int. Cl.
| | | |
|---|---|---|
| *C08J 5/04* | (2006.01) | |
| *B32B 5/26* | (2006.01) | |
| *C08G 64/06* | (2006.01) | |
| *C08G 64/28* | (2006.01) | |
| C08L 69/00 | (2006.01) | |
| B32B 27/24 | (2006.01) | |
| B32B 27/28 | (2006.01) | |
| B32B 27/36 | (2006.01) | |

(52) U.S. Cl.
CPC ................ *B32B 5/26* (2013.01); *C08G 64/06* (2013.01); *C08G 64/28* (2013.01); *C08J 5/04* (2013.01); *B32B 2250/20* (2013.01); *B32B 2260/023* (2013.01); *B32B 2260/046* (2013.01); *B32B 2262/106* (2013.01); *B32B 2307/54* (2013.01); *B32B 2457/00* (2013.01); *B32B 2605/08* (2013.01); *B32B 2605/12* (2013.01); *B32B 2605/18* (2013.01); *C08J 2369/00* (2013.01)

(58) Field of Classification Search
None
See application file for complete search history.

(56) References Cited

U.S. PATENT DOCUMENTS

| | | | |
|---|---|---|---|
| 5,318,847 A | 6/1994 | Fukushima et al. | |
| 2011/0028601 A1* | 2/2011 | Nitta | ........................ G02B 1/04 524/404 |
| 2012/0164444 A1* | 6/2012 | Kinoshita | ............. B32B 27/308 428/343 |
| 2020/0140635 A1* | 5/2020 | Sugiyama | ................. C08J 5/042 |
| 2020/0277453 A1* | 9/2020 | Sugiyama | ................. C08J 5/042 |

FOREIGN PATENT DOCUMENTS

| | | |
|---|---|---|
| JP | 62-015329 | 1/1987 |
| JP | 05-156081 | 6/1993 |
| JP | 05-263363 | 10/1993 |
| JP | 2005-225993 | 8/2005 |
| JP | 2011-140165 | 7/2011 |
| JP | 2013-147588 | 8/2013 |
| JP | 2013-256616 | 12/2013 |
| JP | 2015-067812 | 4/2015 |
| JP | 2015-067813 | 4/2015 |
| JP | 2015-203058 | 11/2015 |
| WO | 2016/158843 | 10/2016 |
| WO | 2016/186100 | 11/2016 |

OTHER PUBLICATIONS

Shirahama, Y. and Ohama, F. (2001). Polyarylates. In Encyclopedia of Polymer Science and Technology, (Ed.), https://doi.org/10.1002/0471440264.pst254 (Year: 2001).*
Official Communication issued in International Bureau of WIPO Patent Application No. PCT/JP2018/018458, dated Jul. 24, 2018.
Extended European Search Report dated May 15, 2020 in EP Application No. 18806736.7.

* cited by examiner

*Primary Examiner* — Michael J Feely
(74) *Attorney, Agent, or Firm* — Greenblum & Bernstein, P.L.C.

(57) ABSTRACT

A sheet formed from a carbon fiber reinforced thermoplastic resin with a simplified production process and excellent mechanical characteristics, and a production method of said sheet is provided. This sheet is formed from a carbon fiber reinforced thermoplastic resin that contains carbon fibers, dichloromethane, and a thermoplastic resin containing at least one of a polycarbonate resin and a polyarylate resin, and the content of the dichloromethane contained in the sheet is 10-10,000 ppm by mass.

7 Claims, No Drawings

SHEET FORMED FROM CARBON FIBER REINFORCED THERMOPLASTIC RESIN, AND PRODUCTION METHOD OF SAID SHEET

TECHNICAL FIELD

The present invention relates to a sheet formed from a carbon fiber reinforced thermoplastic resin, which can favorably be used as an aircraft part, a spacecraft part, an automobile part, a watercraft part, an electronic device part, a sports-related part or the like, and to a method for producing said sheet.

BACKGROUND ART

Since carbon fibers, glass fibers and aramid fibers are excellent in elastic modulus and strength with a lower density as compared to metals, composite materials obtained by combining these fibers with various matrix resins are used in many fields such as aircraft parts, spacecraft parts, automobile parts, watercraft parts, construction materials and sporting goods. In particular, a carbon fiber reinforced resin (CFRP) which is a composite material consisting of a combination of carbon fibers and an epoxy resin or an unsaturated polyester resin is widely used.

Although carbon fiber reinforced resins that have a conventional thermosetting resin as the matrix are disadvantageous as they require a great deal of time for thermosetting, carbon fiber reinforced thermoplastic resins that have a thermoplastic resin as the matrix (hereinafter, sometimes referred to as "CFRTP") have recently been developed in the expectation for use as a composite material that allows high-cycle molding.

While a short fiber reinforced thermoplastic resin that allows molding of a complicated shape has already been put to practical use, it is disadvantageous for having the problem of significantly low elastic modulus as compared to light-weight metals due to the short fiber length of the reinforcement fibers. Therefore, there is a strong demand for a continuous fiber reinforced thermoplastic resin.

Patent document 1 discloses a method for producing a glass fiber textile reinforced polycarbonate resin molded product, the method comprising heating and pressing a laminated body made of a polycarbonate resin film and a resin-impregnated sheet resulting from removing a solvent contained in a solution of a polycarbonate resin from a glass fiber textile impregnated with said solution, but further improvement in the mechanical characteristics has been required.

PRIOR ART DOCUMENTS

Patent Documents

Patent document 1: Japanese Patent Laid-open Publication No. 2011-140165

SUMMARY OF THE INVENTION

Problems to be Solved by the Invention

The present invention has an objective of providing a sheet formed from a carbon fiber reinforced thermoplastic resin which can be produced by a simplified process and which has excellent mechanical characteristics, and a method for producing said sheet.

Means for Solving the Problems

The present inventors have gone through intensive studies to solve the aforementioned problem, and as a result of which found that a sheet formed from a carbon fiber reinforced thermoplastic resin which can be produced by a simplified process and which has excellent mechanical characteristics can be obtained by employing an interfacial polymerization process and using a resin containing a predetermined amount of dichloromethane, thereby accomplishing the present invention. Thus, the above-mentioned problem can be solved by the present invention hereinbelow.

<1> A sheet formed from a carbon fiber reinforced thermoplastic resin comprising carbon fibers, dichloromethane and a thermoplastic resin containing at least one of a polycarbonate resin and a polyarylate resin, wherein the content of dichloromethane contained in the sheet is 10-10,000 ppm by mass.

<2> The sheet according to <1> above, wherein the carbon fibers are continuous fibers.

<3> The sheet according to either one of <1> and <2>, wherein the sheet comprises the carbon fibers for 20-80 vol % and the thermoplastic resin for 80-20 vol %.

<4> The sheet according to any one of <1> to <3> above, wherein the viscosity-average molecular weight of the polycarbonate resin and the polyarylate resin is 10,000-100,000.

<5> A laminate sheet obtained by directly laminating the sheet according to any one of <1> to <4> above.

<6> The laminate sheet according to <5> above, which does not contain a carbon fiber-free sheet.

<7> A method for producing a carbon fiber reinforced thermoplastic resin sheet, the method comprising the steps of:

producing a thermoplastic resin solution by an interfacial polymerization process by dissolving a thermoplastic resin containing at least one of a polycarbonate resin and a polyarylate resin in dichloromethane;

impregnating the thermoplastic resin solution into carbon fibers; and evaporating dichloromethane from the carbon fibers impregnated with the thermoplastic resin solution.

<8> The production method according to <7> above, wherein the concentration of the polycarbonate resin and the polyarylate resin in the thermoplastic resin solution is 10-30 mass %.

Advantageous Effect of the Invention

The present invention can provide a sheet formed from a carbon fiber reinforced thermoplastic resin which can be produced by a simplified process and which has excellent mechanical characteristics, and a method for producing said sheet.

EMBODIMENTS FOR CARRYING OUT THE INVENTION

Hereinafter, the present invention will be detailed by illustrating a production example, examples and the like, although the present invention is not limited to the illustrated production example or examples, and can be carried out by any alternative method as long as it does not depart from the scope of the present invention.

The sheet of the present invention is a sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a constituent unit derived from a dihydric phenol represented by General formula (1) above, and the content of dichloromethane contained in the sheet is 10-10,000 ppm by mass.

<Carbon Fibers>

The carbon fibers used for the present invention are preferably continuous fibers. The average fiber length of the continuous fibers is preferably 10 mm or longer and more preferably 30 mm or longer. In addition, the continuous fibers may take a form of a unidirectional sheet, a woven sheet, a multiaxial laminate sheet or the like.

While the number of single fibers included in a fiber bundle (filament), the number of filaments included in a bundle of filaments (tow) and the structure thereof may vary depending on the carbon fibers, the number of single fibers, the number of filaments and the structure thereof according to the present invention are not limited and various carbon fibers may be used.

The proportion of the carbon fibers in the carbon fiber reinforced thermoplastic resin of the present invention is preferably 20-80 vol %, and more preferably 30-70 vol % and still more preferably 40-60 vol % from the viewpoint of the mechanical properties of the carbon fiber reinforced thermoplastic resin.

<Thermoplastic Resin>

At least one of the polycarbonate resin and the polyarylate resin contained in the thermoplastic resin used for the present invention has a constituent unit derived from a dihydric phenol represented by General formula (1) below, where either a homopolymer or a copolymer may be used.

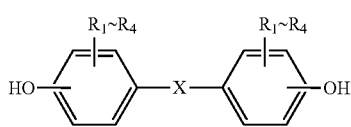

(1)

(in General formula (1), $R_1$-$R_4$ each independently represent hydrogen, a halogen, a nitro, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group; and X is —O—, —S—, —SO—, —SO$_2$—, —CO— or a divalent group represented by any of Formulae (2) to (5) below):

$$\left[ \begin{array}{c} R_5 \\ | \\ -C- \\ | \\ R_6 \end{array} \right]_c \quad (2)$$

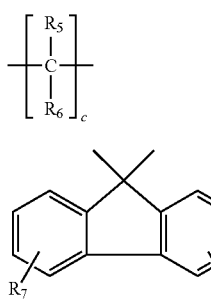

(3)

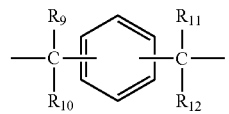

(4)

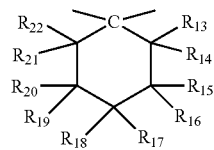

(5)

in Formula (2), $R_5$ and $R_6$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_5$ and $R_6$ bond with each other to form a C3-C20 carbon ring or a C1-C20 heterocyclic ring.

From the viewpoint of the availability of the raw material, $R_5$ preferably represents a C1-C3 alkyl group or a C6-C12 aryl group.

From the viewpoint of the availability of the raw material, $R_6$ preferably represents a C1-C3 alkyl group or a C6-C12 aryl group.

In addition, from the viewpoint of the availability of the raw materials, $R_5$ and $R_6$ preferably bond with each other to form a C6-C12 carbon ring.

c represents an integer of 0-20 and preferably represents 1 or 2 from the viewpoint of the availability of the raw material.

In Formula (3), $R_7$ and $R_8$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_7$ and $R_8$ bond with each other to form a C3-C20 carbon ring or a C1-C20 heterocyclic ring.

From the viewpoint of the availability of the raw material, $R_7$ preferably represents hydrogen or a methyl group.

From the viewpoint of the availability of the raw material, $R_8$ preferably represents hydrogen or a methyl group.

In addition, from the viewpoint of the availability of the raw material, $R_7$ and $R_8$ preferably bond with each other to form a C5-C12 carbon ring.

In Formula (4), $R_9$-$R_{12}$ each independently represent hydrogen, a halogen, an optionally substituted C1-C20 (preferably C1-C9) alkyl group, an optionally substituted C1-C5 (preferably C1-C3) alkoxy group, an optionally substituted C6-C12 (preferably C6-C8) aryl group, an optionally substituted C7-C17 (preferably C7-C12) aralkyl group or an optionally substituted C2-C15 (preferably C2-C5) alkenyl group. The optional substituent may be a halogen, a C1-C20 alkyl group or a C6-C12 aryl group. Moreover, $R_9$ and $R_{10}$, and $R_{11}$ and $R_{12}$ may bond with each other, respectively, to form a C3-C20 carbon ring or a C1-C20 heterocyclic ring.

In Formula (5), $R_{12}$-$R_{22}$ each independently represent a hydrogen atom or a C1-C3 alkyl group, where at least one of $R_{13}$-$R_{22}$ is a C1-C3 alkyl group.

From the viewpoint of the availability of the raw materials, $R_{13}$-$R_{22}$ preferably each independently represent hydrogen or a methyl group.

Examples of the dihydric phenol of General formula (1) above include 2,2-bis(4-hydroxyphenyl)propane [=bisphenol A], bis(4-hydroxyphenyl)-p-diisopropyl benzene, 4,4'-dihydroxy diphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxy diphenylsulfone, bis(4-hydroxyphenyl)sulfide, 4,4'-dihydroxy diphenyl ether, 4,4'-dihydroxy-3,3'-dimethyl diphenyl ether, 4,4'-dihydroxy-2,5-diethoxy diphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene and 2,2-bis(4-hydroxyphenyl)hexafluoropropane, where it is preferably a bis(4-hydroxyphenyl)alkane, and particularly preferably 2,2-bis(4-hydroxyphenyl)propane [bisphenol A]. These aromatic dihydroxy compounds may be used alone or two or more of them may be used in mixture.

The polycarbonate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

Meanwhile, the polyarylate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

As long as the effect of the present invention may be exhibited, the thermoplastic resin may contain a component other than at least one of the polycarbonate resin and the polyarylate resin, and may be blended with other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

Examples of other resin include polycarbonate resins other than the polycarbonate resin used according to the present invention, polyarylate resins other than the polyarylate resin used according to the present invention, thermoplastic polyester resins such as a polyethylene terephthalate resin (PET resin), polytrimethylene terephthalate (PIT resin) and a polybutylene terephthalate resin (PBT resin); styrene-based resins such as a polystyrene resin (PS resin), a high impact polystyrene resin (HIPS), an acrylonitrile-styrene copolymer (AS resin) and a methyl methacrylate-styrene copolymer (MS resin); elastomers such as a core-shell structured elastomer like a methyl methacrylate-acrylic rubber-styrene copolymer (MAS) and a polyester-based elastomer; polyolefin resins such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone.

The proportion of these components in 100 mass % of the thermoplastic resin is preferably 0-50 mass % and more preferably 0-20 mass %.

<Dichloromethane>

The sheet of the present invention is characterized in that the content of dichloromethane contained in the sheet is 10-10,000 ppm by mass. The content of dichloromethane contained in the sheet is preferably 10-5,000 ppm by mass, and more preferably 10-1,000 ppm by mass. If the content of dichloromethane exceeds 10,000 ppm by mass, gas may be generated upon heat processing the sheet of the present invention by press molding or the like due to dichloromethane contained, or the sheet may have poor appearance (void) after the heat processing.

The method for measuring the content of dichloromethane contained in the sheet of the present invention is described in the later-described examples.

According to the present invention, the process for adjusting the content of dichloromethane contained in the sheet to 10-10,000 ppm by mass and acquiring good sheet appearance at the same time may be, for example, to adjust the drying temperature and the drying time in the step of evaporating dichloromethane from the carbon fibers impregnated with the thermoplastic resin solution obtained by dissolving the thermoplastic resin containing at least one of the polycarbonate resin and the polyarylate resin in dichloromethane. Specifically, dichloromethane is preferably evaporated to some degree, for example, by drying without external heating (e.g., air drying) or with a little aid of external heating, and then drying with an aid of external heating. Air drying may be carried out by simply leaving the carbon fiber at room temperature, where air may be sent to speed up the drying.

<Carbon Fiber Reinforced Thermoplastic Resin>

The proportion of the carbon fibers and the thermoplastic resin in the carbon fiber reinforced thermoplastic resin of the present invention is preferably such that the carbon fibers account for 20-80 vol % while the thermoplastic resin accounts for 80-20 vol %, more preferably such that the carbon fibers account for 30-70 vol % while the thermoplastic resin accounts for 70-30 vol %, and still more preferably such that the carbon fibers account for 40-60 vol % while the thermoplastic resin accounts for 60-40 vol % from the viewpoint of the mechanical strength of the carbon fiber reinforced thermoplastic resin.

If the proportion of the carbon fibers falls below this range, the mechanical properties of the carbon fiber reinforced thermoplastic resin will be equal to or poorer than those of lightweight metals. On the other hand, if the proportion of the carbon fibers exceeds this range, the amount of the resin will be small and thus the action of the matrix resin to bundle the carbon fibers may not be effective, in which case the mechanical strength is deteriorated.

The carbon fiber reinforced thermoplastic resin of the present invention may contain a component other than the carbon fibers, the thermoplastic resin and dichloromethane. Examples of such component include other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

<Sheet and Laminate Sheet>

While the thickness of the sheet of the present invention is not particularly limited, it is preferably 0.01 mm-1 mm and more preferably 0.05 mm-0.5 mm.

Preferably, the sheet of the present invention is directly laminated to form a laminate sheet. In particular, a laminate sheet that does not contain a carbon fiber-free sheet is preferable.

An example of the method for producing a laminate sheet by laminating the sheet of the present invention includes a press molding method.

<Method for Producing Carbon Fiber Reinforced Thermoplastic Resin>

A method for producing a carbon fiber reinforced thermoplastic resin sheet of the present invention comprises the steps of: producing a thermoplastic resin solution by an interfacial polymerization process by dissolving a thermoplastic resin containing at least one of a polycarbonate resin and a polyarylate resin in dichloromethane; impregnating the thermoplastic resin solution into carbon fibers; and evaporating dichloromethane from the carbon fibers impregnated with the thermoplastic resin solution.

According to the production method of the present invention, the concentration of the polycarbonate resin in the thermoplastic resin solution is preferably 10-30 mass %, and more preferably 12-25 mass %. If the concentration of the polycarbonate resin is lower than 10 mass %, bubbling may occur during drying in the subsequent step whereas if the concentration is higher than 30 mass %, the solution viscosity may become significantly high which could render handling in the impregnating step difficult.

Moreover, according to the production method of the present invention, the concentration of the polyarylate resin in the thermoplastic resin solution is preferably 10-30 mass %, and more preferably 12-25 mass %. If the concentration of the polyarylate resin is lower than 10 mass %, bubbling may occur during drying in the subsequent step whereas if the concentration is higher than 30 mass %, the solution viscosity may become significantly high which could render handling in the impregnating step difficult.

(Step of Producing Thermoplastic Resin Solution)

For the reaction of the interfacial polymerization process, reactants including a dihydric phenol, a monohydric phenol as a chain terminator and, if necessary, an antioxidant used for preventing oxidation of the dihydric phenol and phosgene or triphosgene as a carbonate binder, are mixed in the presence of dichloromethane and an alkaline aqueous solution while keeping normal pH at 10 or higher. Thereafter, a polymerization catalyst such as a tertiary amine or a quaternary ammonium salt is added to carry out the interfacial polymerization and the resulting resin solution is purified to give a polycarbonate resin solution. The timing of adding the chain terminator is not particularly limited as long as it is added at some point between the phosgenation to the start of the polymerization reaction. Here, the reaction temperature is 0-35° C. and the reaction time is several minutes to several hours.

(Impregnating Step)

This is a step of impregnating the polycarbonate resin solution according to the present invention into carbon fibers. The impregnating method is not particularly limited, and various methods such as a method of immersing the fibers in a tank containing the solution, a method of passing the fibers through a spray of the solution atomized in a tank, or a method of spraying the solution to the fibers may be employed. Among them, the method of immersing the fibers in a tank containing the solution is favorable since it is most convenient and allows uniform application of the solution.

(Evaporation (Drying) Step)

This is a step of evaporating dichloromethane from the carbon fibers impregnated with the thermoplastic resin solution such as the polycarbonate resin solution. Dichloromethane is preferably evaporated to some degree, for example, by subjecting it to drying without external heating (e.g., air drying) or with a little aid of external heating, and then to drying with an aid of external heating. Air drying may be carried out by simply leaving the carbon fiber at room temperature, where air may be sent to speed up the drying.

EXAMPLES

Hereinafter, the present invention will be described specifically by way of examples and comparative examples. The embodiments may appropriately be altered as long as the effect of the invention is achieved.

<Conditions for Measuring Viscosity-Average Molecular Weight (Mv)>

Measurement instrument: Ubbelohde capillary viscometer

Solvent: Dichloromethane

Concentration of resin solution: 0.5 grams/deciliter

Measurement temperature: 25° C.

Subsequent to a measurement under the above conditions, the intrinsic viscosity [η] deciliter/gram is determined at a Huggins coefficient of 0.45 to calculate the viscosity-average molecular weight by the following equation.

$$\Theta = 1.23 \times 10^{-4} \times Mv^{0.83}$$

<Conditions for Measuring Content of Dichloromethane (MC)>

Measurement instrument: Gas chromatograph (GC-2014 manufactured by Shimadzu Corporation)

Solvent: Chloroform

Concentration of carbon fiber reinforced thermoplastic resin solution: 2 grams/20 milliliters Sample vaporization chamber: 200° C., 252 kPa Column: 60° C. at the start of measurement, 120° C. at the end of measurement, measurement time 10 minutes Detector: 320° C.

Subsequent to a measurement under the above conditions, a peak area at a retention time of 4.4 minutes was determined to calculate the content of dichloromethane based on the separately calculated calibration curve. The dichloromethane content of less than 10 ppm by mass was considered N.D.

<Conditions for Measuring Carbon Fiber Content (Vf)>

The carbon fiber content (Vf) was measured based on JIS K 7075.

<Drop Weight Impact Test>

Instrument used: CEAST9350 manufactured by Instron

Striker: 10 mmφ, 5.136 kg

Sample support: 40 mmφ

Example 1

(Step of Producing Polycarbonate Resin Solution)

7.5 kg (32.89 mol) of bisphenol A (BPA) manufactured by Nippon Steel and Sumikin Chemical and 30 g of hydrosulfite as an antioxidant were added to and dissolved in 54 kg of a 9 m/m % aqueous sodium hydroxide solution. To this, 40 kg of dichloromethane was added, and 4.4 kg of phosgene was blown into the resultant by spending 30 minutes while stirring and keeping the solution temperature in a range of 15° C.–25° C.

After the phosgene blowing, 2 kg of a 9 m/m % aqueous sodium hydroxide solution, 7.5 kg of dichloromethane, and a solution obtained by dissolving 193.5 g (1.29 mol) of p-tert-butylphenol in 1 kg of dichloromethane were added and vigorously stirred for emulsification. Thereafter, 10 ml of triethylamine as a polymerization catalyst was added to allow polymerization for about 40 minutes.

The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 21,500.

(Impregnating and Drying Steps)

A carbon fiber textile (TORAYCA cloth CO6347B manufactured by Toray Industries) was cut into a size of 10 cm×10 cm, which was impregnated with the polycarbonate resin solution in an impregnation tank. At the end of the impregnation, the resultant was dried in a thermostatic chamber at 25° C. for 5 hours, and then dried in a hot air dryer at 100° C. for an hour to give a carbon fiber reinforced thermoplastic resin.

The carbon fiber content (Vf) of the resulting carbon fiber reinforced thermoplastic resin was 57 vol %. The resulting carbon fiber reinforced thermoplastic resin was used to measure the dichloromethane content, which turned out to be 50 ppm by mass. The thickness of the resulting carbon fiber reinforced thermoplastic resin was 0.268 mm. The results are summarized in Table 1.

(Evaluation of Appearance after Molding)

The resulting carbon fiber reinforced thermoplastic resin was pressed at 100 kgf for 5 minutes while being heated at 265° C. to obtain a sheet for evaluating the appearance.

No void was found in the resulting sheet for evaluating the appearance, and thus the appearance was "good".

(Heat Pressing Step)

Five sheets of the resulting carbon fiber reinforced thermoplastic resin were laminated and pressed for 15 minutes while being heated at 265° C. to give a laminate sheet of the carbon fiber reinforced thermoplastic resin.

(Evaluation of Mechanical Characteristics)

A 60 mm square piece was cut out from the resulting laminate sheet of the carbon fiber reinforced thermoplastic resin with a cross saw to perform a drop weight impact test, where the fracture energy was 4.47 J, the maximum stress was 874 N, and no separation was observed between the layers at the fractured site. The results are summarized in Table 1.

Example 2

(Steps of Producing Polycarbonate Resin Solution, Impregnating and Drying)

A carbon fiber reinforced thermoplastic resin was obtained by using the polycarbonate resin solution obtained in Example 1 and operating in the same manner as Example 1 except that drying was conducted in a hot air dryer at 100° C. for an hour (in other words, drying was not conducted in a thermostatic chamber at 25° C. for 5 hours at the end of the impregnation).

The carbon fiber content (Vf) of the resulting carbon fiber reinforced thermoplastic resin was 52 vol %. The resulting carbon fiber reinforced thermoplastic resin was used to measure the dichloromethane content, which turned out to be 120 ppm by mass. The thickness of the resulting carbon fiber reinforced thermoplastic resin was 0.261 mm. The results are summarized in Table 1.

(Evaluation of Appearance after Molding)

The resulting carbon fiber reinforced thermoplastic resin was pressed at 100 kgf for 5 minutes while being heated at 265° C. to obtain a sheet for evaluating the appearance.

No void was found in the resulting sheet for evaluating the appearance, and thus the appearance was "good".

Example 3

(Steps of Producing Polycarbonate Resin Solution, Impregnating and Drying)

A carbon fiber reinforced thermoplastic resin was obtained by using the polycarbonate resin solution obtained in Example 1 and operating in the same manner as Example 1 except that drying was not conducted in a hot air dryer (in other words, drying was conducted only in a thermostatic chamber at 25° C. for 5 hours at the end of the impregnation).

The carbon fiber content (Vf) of the resulting carbon fiber reinforced thermoplastic resin was 52 vol %. The resulting carbon fiber reinforced thermoplastic resin was used to measure the dichloromethane content, which turned out to be 4,680 ppm by mass. The thickness of the resulting carbon fiber reinforced thermoplastic resin was 0.271 mm. The results are summarized in Table 1.

(Evaluation of Appearance after Molding)

The resulting carbon fiber reinforced thermoplastic resin was pressed at 100 kgf for 5 minutes while being heated at 265° C. to obtain a sheet for evaluating the appearance.

No void was found in the resulting sheet for evaluating the appearance, and thus the appearance was "good".

Comparative Example 1

(Step of Producing Polycarbonate Resin Powder)

The polycarbonate resin solution obtained in Example 1 was dropped in warm water for granulation, and dehydrated with a solid-liquid separator. Thereafter, the remaining solvent was evaporated in a dryer to obtain polycarbonate resin powder.

(Step of Producing Polycarbonate Film)

The resulting polycarbonate resin powder was subjected to extrusion using a twin-screw kneader TEM26DS manufactured by Toshiba Machine (screw diameter: 28.2 mm, extruder temperature: 270° C., die width: 330 mm, die temperature: 270° C.) to give a 50 μm thick film.

(Heat Pressing Step)

The resulting film and a carbon fiber textile (TORAYCA cloth CO6347B manufactured by Toray Industries) were cut into a size of 10 cm×10 cm, respectively, and five each of them were alternately laminated and pressed for 15 minutes while being heated at 265 C to give a laminate sheet of a carbon fiber reinforced thermoplastic resin.

The carbon fiber content (Vf) of the laminate sheet of the carbon fiber reinforced thermoplastic resin was 56 vol %.

(Evaluation of Mechanical Characteristics)

A 60 mm square piece was cut out from the laminate sheet of the carbon fiber reinforced thermoplastic resin with a cross saw to perform a drop weight impact test, where the fracture energy was 4.05 J, the maximum stress was 829 N, and separation was observed between the layers at the fractured site. The results are summarized in Table 1.

Comparative Example 2

(Steps of Producing Polycarbonate Resin Solution, Impregnating and Drying)

A carbon fiber reinforced thermoplastic resin was obtained by using the polycarbonate resin solution obtained in Example 1 and operating in the same manner as Example 1 except that drying was conducted in a thermostatic chamber at 25° C. for 2 hours without drying in a hot air dryer.

The carbon fiber content (Vf) of the resulting carbon fiber reinforced thermoplastic resin was 58 vol %. The resulting carbon fiber reinforced thermoplastic resin was used to measure the dichloromethane content, which turned out to be 12,530 ppm by mass. The thickness of the resulting carbon fiber reinforced thermoplastic resin was 0.252 mm. The results are summarized in Table 1.

(Evaluation of Appearance after Molding)

The resulting carbon fiber reinforced thermoplastic resin was pressed at 100 kgf for 5 minutes while being heated at 265° C. to obtain a sheet for evaluating the appearance.

Voids were found in the resulting sheet for evaluating the appearance, and thus the appearance was "poor".

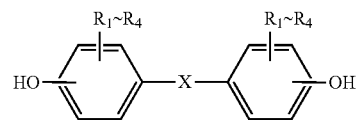

(1)

in formula (1), $R_1$-$R_4$ each independently represent hydrogen, a halogen, a nitro, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group; and X is —O—, —S—, —SO—, —SO$_2$—, —CO— or a divalent group represented by any of Formulae (2) to (5) below:

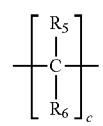

(2)

TABLE 1

| Example | Constituent unit | Viscosity-average molecular weight | Drying conditions | Vf [%] | MC content [ppm] | Thickness [mm] | Evaluation of appearance after molding | Fracture E [J] | Maximum stress [N] |
|---|---|---|---|---|---|---|---|---|---|
| Example 1 | BPA | 21,500 | 25° C./5 hr, 100° C./1 hr | 57 | 50 | 0.268 | Good | 4.47 | 874 |
| Example 2 | BPA | 21,500 | 100° C./1 hr | 52 | 120 | 0.261 | Good | — | — |
| Example 3 | BPA | 21,500 | 25° C./5 hr | 52 | 4,680 | 0.271 | Good | — | — |
| Comparative example 1 | BPA | 21,500 | — | 56 | N.D. | — | — | 4.05 | 829 |
| Comparative example 2 | BPA | 21,500 | 25° C./2 hr | 58 | 12,530 | 0.252 | Poor | — | — |

The invention claimed is:

1. A method for producing a carbon fiber reinforced thermoplastic resin sheet, the method comprising:

producing a thermoplastic resin solution wherein a thermoplastic resin containing a polycarbonate resin has been dissolved in dichloromethane by an interfacial polymerization process;

impregnating the thermoplastic resin solution into carbon fibers; and evaporating dichloromethane from the carbon fibers impregnated with the thermoplastic resin solution, wherein the producing a thermoplastic resin solution comprises (i) mixing reactants including a dihydric phenol and phosgene or triphosgene in the presence of the dichloromethane and an alkaline aqueous solution, (ii) thereafter adding a polymerization catalyst into the reactants to carry out the interfacial polymerization process, and (iii) purifying the resulting resin solution to give the thermoplastic resin solution.

2. The production method according to claim 1, wherein a concentration of the polycarbonate resin in the thermoplastic resin solution is 10-30 mass %.

3. The production method according to claim 1, wherein the dihydric phenol is represented by formula (1) below:

-continued

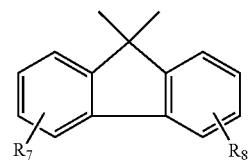

(3)

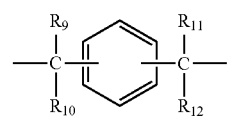

(4)

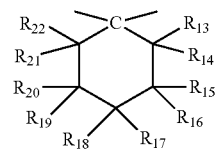

(5)

in Formula (2), $R_5$ and $R_6$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_5$ and $R_6$ bond with each other to form a C3-C20 carbon ring or a C1-C20 heterocyclic ring;

in Formula (3), $R_7$ and $R_8$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group, or $R_7$ and $R_8$ bond with each other to form a C3-C20 carbon ring or a C1-C20 heterocyclic ring;

in Formula (4), $R_9$-$R_{12}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group or an optionally substituted C2-C15 alkenyl group; and in Formula (5), $R_{13}$-$R_{22}$ each independently represent a hydrogen atom or a C1-C3 alkyl group, where at least one of $R_{13}$-$R_{22}$ is a C1-C3 alkyl group.

4. The production method according to claim 1, wherein a content of dichloromethane contained in the carbon fiber reinforced thermoplastic resin sheet is 10-10,000 ppm by mass.

5. The production method according to claim 1, wherein the carbon fibers are continuous fibers.

6. The production method according to claim 1, wherein the carbon fiber reinforced thermoplastic resin sheet comprises the carbon fibers for 20-80 vol % and the thermoplastic resin for 80-20 vol %.

7. The production method according to claim 1, wherein a viscosity-average molecular weight of the polycarbonate resin after the interfacial polymerization process is 10,000-100,000.

* * * * *